Aug. 28, 1956  W. J. KNAPPE  2,760,771
FOUNDRY CUPOLA WITH SEPARATE FUEL SUPPLY
Filed July 2, 1952  3 Sheets-Sheet 3
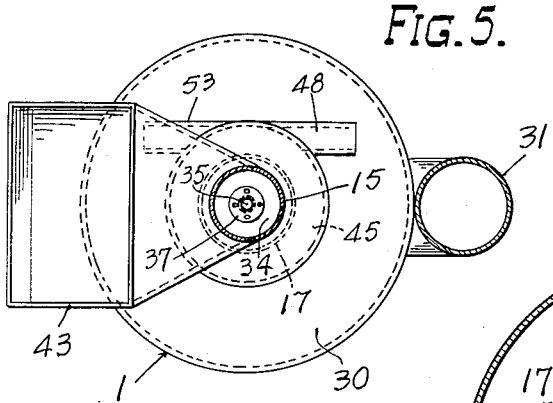
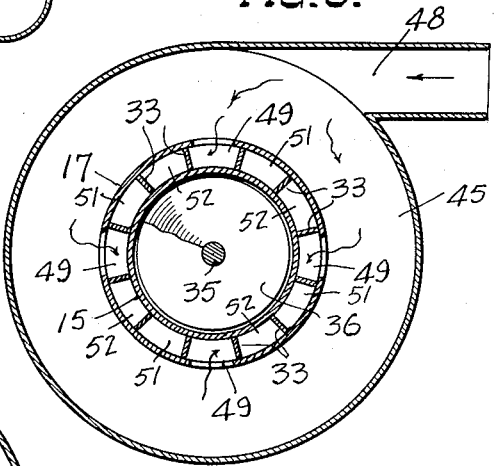
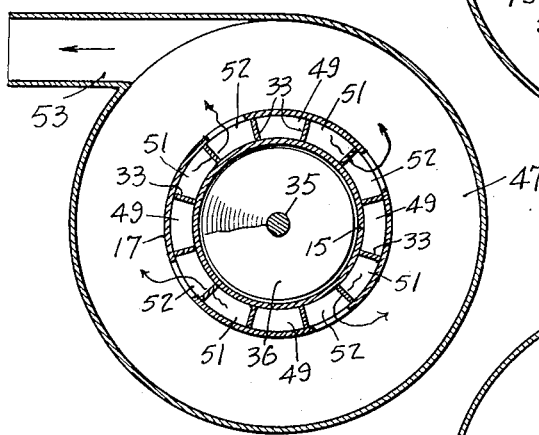
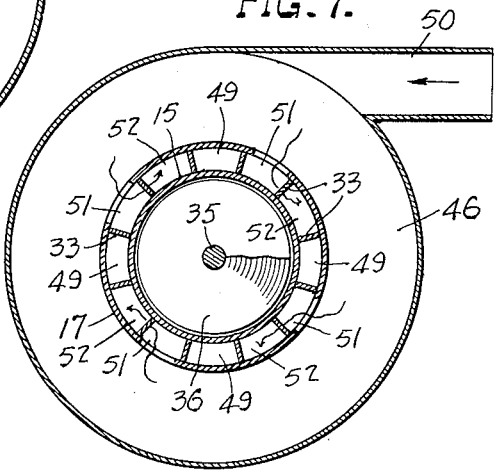
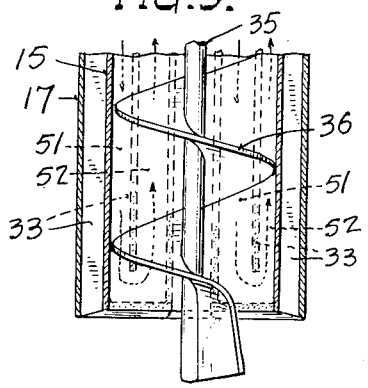
*INVENTOR.*
Walter J. Knappe
BY
*ATTORNEYS.*

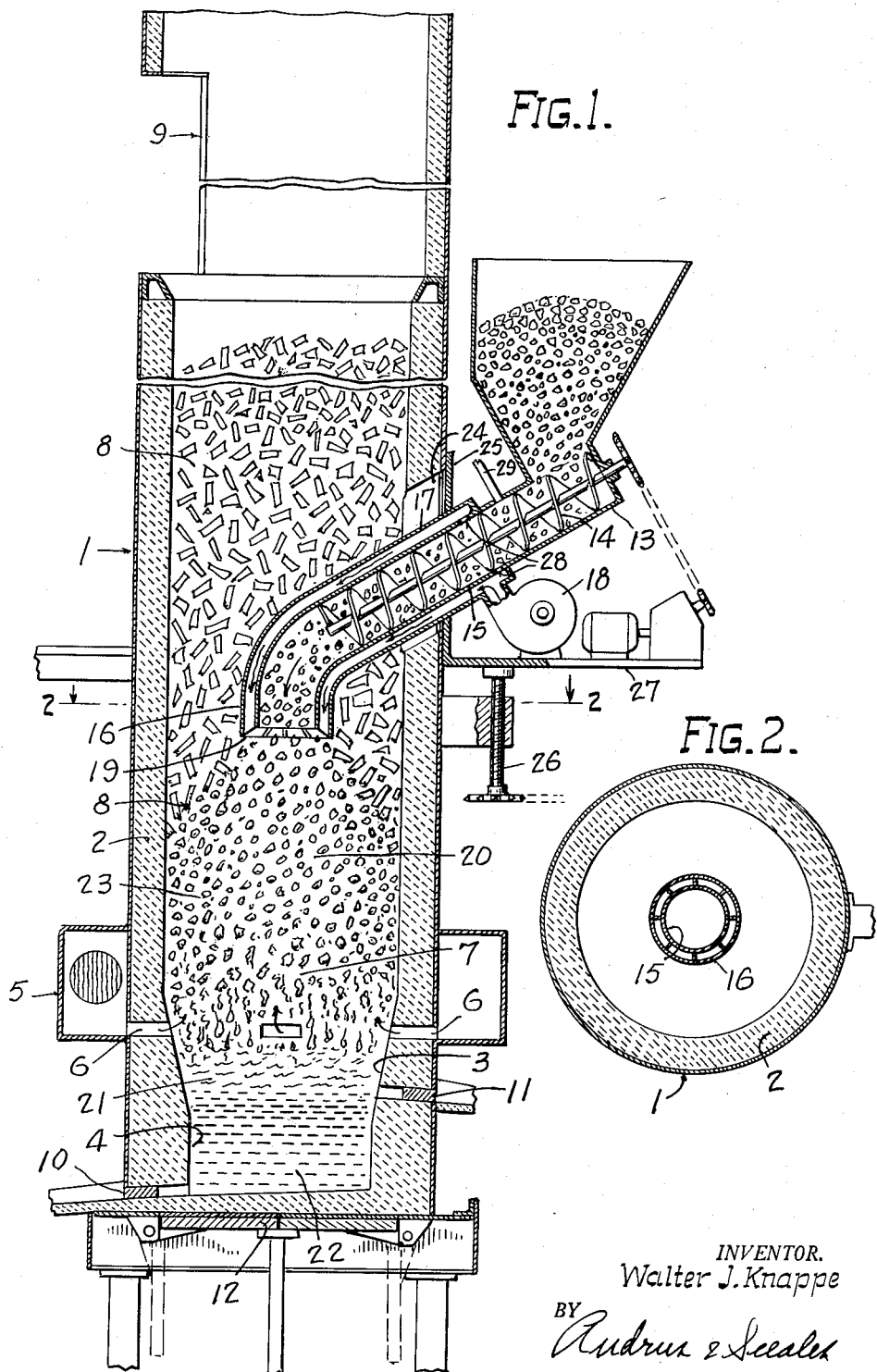
Aug. 28, 1956 — W. J. KNAPPE — 2,760,771
FOUNDRY CUPOLA WITH SEPARATE FUEL SUPPLY
Filed July 2, 1952 — 3 Sheets-Sheet 1
INVENTOR.
Walter J. Knappe

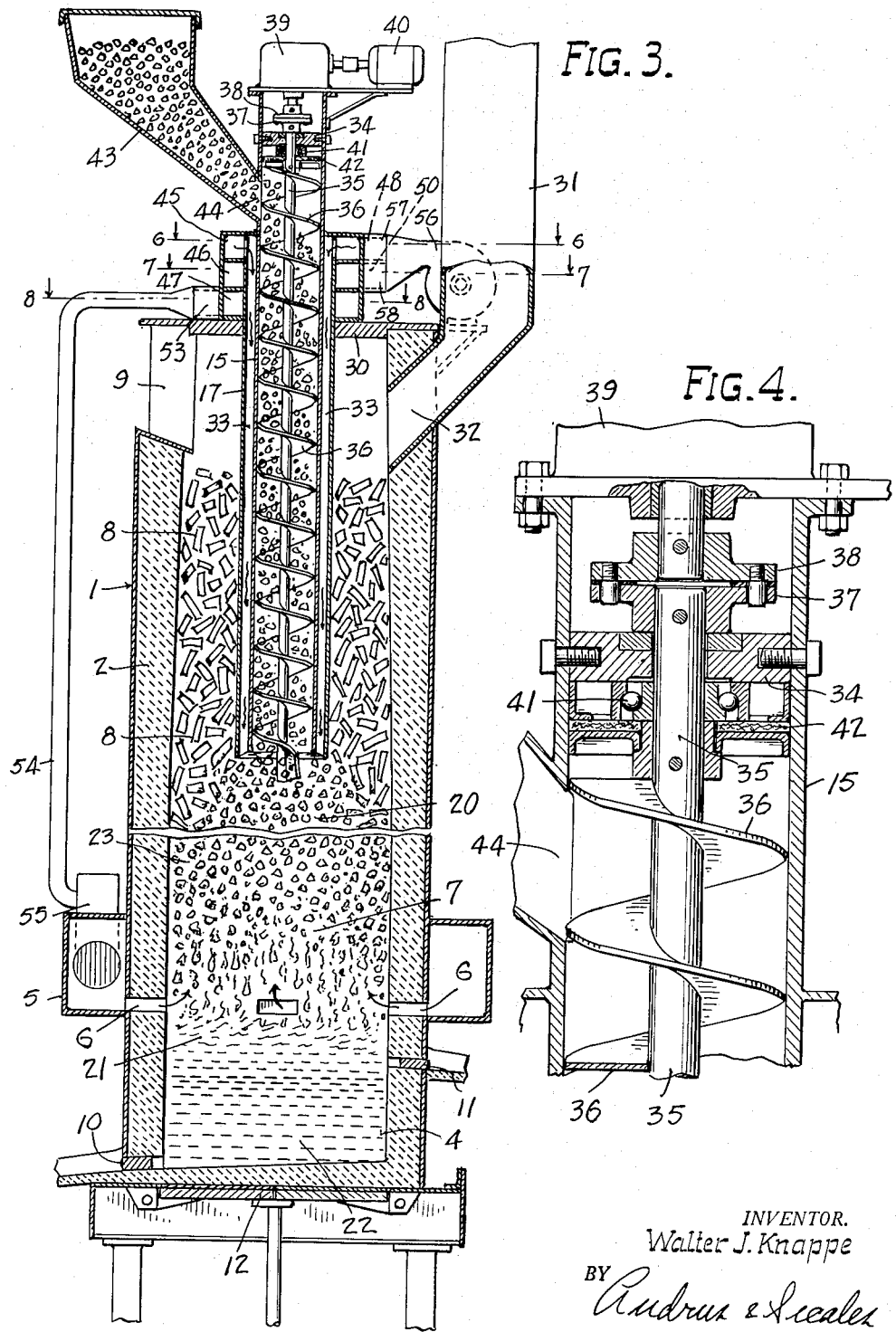

United States Patent Office 2,760,771
Patented Aug. 28, 1956

2,760,771
FOUNDRY CUPOLA WITH SEPARATE FUEL SUPPLY

Walter J. Knappe, Port Washington, Wis.

Application July 2, 1952, Serial No. 296,899

5 Claims. (Cl. 266—27)

This invention relates to a foundry cupola and process for melting metal pig and scrap for the production of molten metal suitable for casting. The present application is a continuation in part of application Serial No. 112,869, filed August 29, 1949, now abandoned.

The invention constitutes an outstanding development in present day foundry equipment and melting practice, wherein a substantial fuel saving is accomplished.

One of the principal objects of the invention is to increase the efficiency of the cupola melting furnace, thereby reducing the fuel input per ton of metal and greatly reducing the cost of operation.

Another object of the invention is to concentrate the heating zone centrally in the furnace in a manner to effect a rapid and complete melting of the metal prior to its passage downwardly through the bed and into the bath beneath.

Another object is to force a solid coke fuel directly into the concentrated heating zone of the cupola.

Another object is to increase the rate of melting obtainable from a given size cupola.

Another object is to provide a cupola in which the inner lining has a longer life.

Another object is to reduce the need for expensive soot and smoke separators at the top of the cupola.

Another object is to provide a closer control of the carbon content and alloy content of the molten metal in the well.

Other objects and advantages of the invention will appear hereinafter.

In carrying out the invention the coke is fed directly into the central heating zone by a forced feed through a jacketed tube and air is supplied through the jacket of the tube directly to the concentrated heating zone for combustion of the fuel.

The metal to be melted is dropped into the cupola through a suitable charging opening, as in usual cupola practice, and is kept separate from the incoming body of coke until it reaches the concentrated heating and melting zone. The metal enters the melting zone by a downward movement around the jacketed coke feed tube and along the outer walls of the cupola and thereby absorbs the heat and tends to keep the walls of the cupola from overheating. As fas as the metal melts it drips downwardly through the coke bed and through the slag to the molten bath beneath.

Heretofore it has been the practice to mix the coke with the metal charge entering the top of the furnace, a practice which resulted in volatilization of otherwise burnable constituents of the coke without sufficient oxygen for combustion, and insofar as combustion took place in the downwardly moving mass in the upper part of the furnace it tended to unduly heat the furnace walls and there was a loss in efficiency. There was a lack of concentration of heat centrally of the furnace and away from the furnace walls.

Attempts to feed the coke separately from the metal have heretofore involved difficulties. Where powdered coke was fed in the air blast through the tuyeres, there was danger of clogging of the tuyeres, and the coke tended to choke or smother the combustion. Furthermore, this practice resulted in a concentrated heat zone near the tuyeres and the outer walls of the furnace were unduly heated as the powdered coke could not be forced into the center of the bed.

Where a separate coke feed column from above has been attempted, as in Patent No. 2,235,939, the coke was not heavy enough to effect its entering into the furnace, and as a consequence the bed was rapidly used up and further operation of the cupola became impossible.

The present invention is based upon the appreciation of the necessity for replenishing the coke at the center of the bed continuously throughout the operation of the cupola. According to the invention the coke is fed by force directly to the center of the bed and along with an adequate supply of air for combustion, so that the metal moving downwardly on the outside of the bed and adjacent to the furnace wall becomes heated to the requisite melting temperature. A substantial portion of the metal is melted at some distance above the bed and above the zone of introduction of coke into the bed.

By maintaining the coke bed of substantial size throughout the operation of the cupola the metal is melted and raised to suitable refining temperature prior to its passage downwardly into the bath, thereby maintaining the latter at the requisite high temperatures for further refinement of the metal and pouring. The maintenance of the coke bed prevents any tendency for chunks of unmelted metal to pass downwardly through the bed into the bath.

The invention is illustrated in the accompanying drawings in which:

Figure 1 is a schematic vertical section through a cupola having a coke feed from one side;

Figure 2 is a transverse section taken on line 2—2 of Figure 1 and showing the mouth of the coke delivery tube in section;

Figure 3 is a schematic vertical section through a cupola having a vertical coke feed tube;

Figure 4 is an enlarged vertical section showing the construction of a thrust bearing for the screw feed of Figure 3;

Figure 5 is a top plan view of the cupola of Figure 3 with the stack sectioned;

Figure 6 is an enlarged transverse horizontal section taken on line 6—6 of Figure 3;

Figure 7 is an enlarged transverse horizontal section taken on line 7—7 of section 3;

Figure 8 is an enlarged transverse horizontal section taken on line 8—8 of Figure 3, and Figure 9 is a detailed section showing the discharge end of a coke feed jacket.

The cupola comprises an upstanding cylindrical metal furnace shaft 1 lined with fire brick 2, and having a bosh 3 at its lower end set upon the walls of a refining well 4. A wind box 5 encircles the cupola at and above the bosh, and has a suitable number of tuyeres 6 for supplying air through the furnace wall into the bottom of the bed 7 of coke. The metal charge 8 at the top of the shaft is supplied through a suitable charging door 9 in the side of the upper portion of the furnace.

A suitable discharge passage 10 is provided in the walls of the well for discharge of the molten metal from the well. A similar discharge passage 11 is provided at a higher level in well 4 for drawing off excess molten slag. A drop out bottom 12 is provided for well 4.

In maintaining the coke bed 7 above bosh 3, the coke is introduced into the bed continuously by means of a power stoker 13, either of the screw or ram type. The screw 14 of the stoker illustrated operates in a jacketed tube 15 which, in the embodiment illustrated in Figures 1 and 2, extends through the side wall of the cupola shaft above the bed and preferably downwardly at a slant into the center of the top of the bed 7 where it discharges the coke straight downwardly and outwardly through the end of the tube.

The outer jacket 17 of tube 15 may be constructed of stainless steel and may be protected on the outside by a thin refractory coating. A fan 18 supplies a blast of air to the upper end of jacket 17, which air flows continuously downwardly through the jacket to the coke bed. For this purpose the lower end of jacket 17 is open and serves as a nozzle 19 to direct the air blast in a circular ring-shaped stream around the outer edge of the discharge column of coke as the latter enters the bed.

By forcing the coke directly into the center of the bed 7 the weight of the column of metal 8 does not interfere with the separate introduction of the coke. Furthermore, a concentrated central heating zone 20 is obtained in the cone of bed 7 just below the charging column of coke from stoker 13. The metal 8 moves downwardly on the outside of the heat zone 20 and is completely melted as it reaches the zone. The molten metal drips through and over the hot coke of the bed and downwardly through the bosh 3 and slag 21 into the bath 22 in well 4.

The coke should be fed to bed 7 at a rate sufficient to maintain the latter against the weight of the metal column 8 and to effect a continuous melting zone 23 encircling the concentrated central heat zone 20 at the top of the bed. The feed of coke may be either continuous, at a variable rate or intermittent, as desired. Suitable controls should be provided for this purpose.

The depth of bed 7 will depend principally upon the kind of metal being melted and the temperatures required, and may be adjusted by raising or lowering the stoker 13 and feed tube 15. For this purpose a vertically extending slot-like opening 24 is provided in the side wall of the cupola shaft to accommodate tube 15 and the opening 24 is closed around the top by a suitable lined shield 25 carried by the tube and moveable up and down with the stoker unit. Any suitable means may be provided for raising or lowering the stoker 13, that shown being in the form of jack screw 26 supporting the platform 27 upon which the stoker and coke hopper are mounted.

A supply of air through jacket 17 may be fixed at a constant rate, once the operating conditions for the particular cupola are established. However, it is possible to regulate the air supply in accordance with the feed rate of the stoker, if desired, care being taken to continue the air supply even though the coke feed stops at intervals.

In general, it is preferred to provide an excess amount of air for the given supply of coke, i. e., an amount sufficient to continually maintain enough oxygen for the complete combustion of the coke. This can be done without heat loss through the stack since practically all of the combustion takes place in the bed and substantially all of the heat is transferred to the metal charge 8 as the combustible gases pass upwardly therethrough.

It will be desirable to feed air through the coke in tube 15 to provide a back draft and prevent combustible gases from passing up through the stoker. For this purpose one or more openings 28 may be provided at the top through the wall of tube 15 to admit air from the surrounding jacket. If desired, opening 28 may be eliminated and combustible gas forced into tube 15 through pipe 29. In this instance the gas serves to prevent draft upwardly through tube 15 and also serves as additional combustible fuel at the discharge end of the tube to increase the heat of the heat zone 20.

In the embodiment illustrated in Figures 3 to 9 the coke feed tube 15 is disposed vertically of the furnace shaft 1 and axially thereof. The shaft is closed at the top by a suitable closure 30 above the charging opening 9.

A stack 31 is supported on the shaft and connected by means of a passage 32 through the side wall of the shaft at the top for discharge of combustible gases from the furnace.

The feed tube 15 is joined to the jacket 17 by a plurality of circumferentially spaced longitudinal strips 33 constituting partitions for the jacket. The outer jacket 17 is secured to the top closure member 30 to support the tube 15 and stoker unit against axial thrust. The tube 15 extends upwardly above the closure 30 to carry the stoker feed mechanism. For this purpose a thrust plate 34 closes the upper end of tube 15. The stoker feed shaft 35 extends downwardly through the thrust plate 34 and has the feed spiral 36 secured thereon and extending to a short distance beyond the lower discharge end of tube 15. The upper end of shaft 35 above thrust plate 34 carries a coupling member 37 disposed to be coupled to a complimentary member 38 on the output drive shaft of a gear box 39 secured on the upper end of tube 15. Members 37 and 38 may constitute an overload slip-clutch, if desired. A suitable electric or air motor 40 drives the reduction gears in box 39 to drive screw 36 at from 4 to 10 R. P. M.

Vertical thrust of screw 36 is resisted by means of an anti-friction thrust bearing 41 secured between shaft 35 and thrust plate 34 beneath the latter. A felt seal 42 is disposed beneath bearing 41 to prevent coal dust from entering the bearing.

The coke is fed to the upper end of tube 15 by means of a hopper 43 having a discharge opening 44 through the side wall of the tube. The top of the hopper 43 is normally sealed by a cover to prevent draft developing in tube 15 and causing burning of coke therein.

The jacket 17 extends upwardly through the top closure member 30 and through air chambers 45, 46 and 47. Each of the air chambers 45, 46 and 47 extend circumferentially of jacket 17 and constitute manifold means connecting with corresponding vertical passages in the jacket.

Chamber 45 is supplied with air through a circumferential inlet 48, and in turn passes air downwardly in one or more passages 49 between partition strips 33 of the jacket 17. Similarly chamber 46 receives a supply of air from inlet passage 50 and in turn supplies air to passages 51 in jacket 17 and adjacent to passages 49. Chamber 47 receives air from passages 52 in jacket 17 and discharges the same through outlet passage 53. Corresponding adjacent passages 51 and 52 in jacket 17 are connected together at the lower end of the jacket, so that air from a passage 51 enters a corresponding adjacent passage 52 and thence travels upwardly of the last passage to discharge chamber 47. Passage 49 is open at the lower end of jacket 17 to discharge air into the downwardly moving coke mass being discharged from the lower end of tube 15.

Air passing through the several passages 49, 51 and 52 of jacket 17 serves to keep the tube 15 and the coke therein cool during operation of the furnace. The air which passes downwardly through passages 51 and then upwardly through passages 52 may be utilized for supplying air to tuyeres 6, and for this purpose a discharge passage 53 is connected by duct 54 to the inlet for a blower 55 that supplies air to the tuyeres.

Air is supplied to chambers 45 and 46 by means of a blower 56 connected by ducts 57 and 58 to the corresponding inlet passages 48 and 50. The relative proportion of air to be supplied to chambers 45 and 46 will depend upon the total air required to prevent over-heating of tube 15 and upon the amount of air needed for combustion of the coke at the top of the bed. The air passing to and through chamber 45 to the coke bed should be related to combustion requirements in order to avoid excessive oxidation of the metal prior to melting.

In the construction shown the tube 15 and jacket 17 are cylindrical and extend downwardly into the center of the top of the coke bed 7 of the furnace. The inner wall of the furnace shaft 1 facing the tube 15 below the charging opening 9 is generally frusto-conical to provide a gradually increasing cross section for receiving the metal charge 8 as the latter drops downwardly toward the bed by gravity. This construction prevents any tendency of the charge binding in the shaft.

The lower end of the jacket 17 extends downwardly beyond the end of the tube 15 to provide a slight outward flare and relief for the coke as it enters the bed. The screw 36 should be close to the inside diameter tube 15 and may have its flights turned to a steeper pitch in that part of the screw that protrudes beyond the end of tube 15, so that the coke emerging from the tube is pushed radially outward instead of downward.

This invention provides a more efficient cupola operation. In prior cupola practice for melting gray iron, it has been quite general to require a ton of coke for every 5 to 8 tons of metal melted. With the present invention it has been possible to melt as high as 14 tons of metal with one ton of coke, counting the bed. The ratio of metal to coke has been substantially increased and a very real saving in fuel is thus obtained. The wider range of coke ratios made possible also extends the variations obtainable in control and operation of the furnace.

Furthermore, the high temperature obtainable by reason of the concentrated heat zone makes it possible with a low scrap to pig ratio to obtain a metal which corresponds to steel in final analysis and which is as fully refined as steel.

Another significant and noticeable feature of the invention lies in the reduction of soot and solids in the stack discharge. The $CO_2$—$CO$ ratio in the stack is also indicative of the importance of the present invention. In general cupola practice heretofore the ratio was about 1:1 with from 12 to 14% of each in the stack gases. With the present invention it has been possible to obtain ratios in excess of 7:1 with about 18% $CO_2$ in the stack gases and only about 2½% $CO$. This indicates a substantial increase in fuel combustion efficiency for the furnace.

I claim:

1. A foundry cupola comprising a vertical furnace shaft with air supply tuyeres to provide a hot bed of coke for melting material charged into the shaft from above the bed, a metal feed spout disposed to discharge coke into the center of the top of the bed separately from the material to be melted, a power feed mechanism disposed to force coke through said spout to replenish the bed during operation of the cupola, a tubular jacket around said coke feed spout, said jacket having longitudinal partitions therein providing separate longitudinal passages for circulation of cooling air about the spout to protect the spout from melting, some of said passages being interconnected at the inner end of the spout for return of air to the outer end for discharge and some being open at the inner end to discharge air around the column of coke being discharged into the center of said bed, and means to force air through said passages in the jacket whereby feed spout is protected and a concentrated heat zone of combustion is effected at the center of the top of the bed.

2. A foundry cupola comprising a vertical furnace shaft with air supply tuyères to provide a hot bed of coke for melting material charged into the shaft from above the bed, a feed spout disposed to discharge coke into the center of the top of the bed, a power feed mechanism disposed to force coke through said spout to replenish the bed during operation of the cupola, and means to force air with the coke through said spout.

3. A foundry cupola comprising a vertical furnace shaft with air supply tuyeres to provide a hot bed of coke for melting material charged into the shaft from above the bed, a feed spout disposed to discharge coke into the center of the top of the bed, a power feed mechanism disposed to force coke through said spout to replenish the bed during operation of the cupola, means to force combustible gas through the coke in said spout, a tubular jacket around said coke feed spout and open at the inner end to discharge air around the column of coke being discharged into the center of said bed, and means to force air through said jacket whereby a concentrated heat zone of combustion is effected at the center of the top of the bed.

4. A foundry cupola comprising a vertical furnace shaft with air supply tuyeres to provide a hot bed of coke for melting material charged into the shaft from above the bed, a closed top for said shaft, a charging opening at the upper end of the shaft, a flue for the escape of combustion gases at the upper end of the shaft, a jacketed coke feed spout extending vertically downward from said closed top centrally of the shaft to the top zone of the coke bed, force feed means to compel coke to move downwardly through said spout and into the top of said coke bed against the weight of the column of material being melted above the bed to replenish the coke in said bed, partitions in said jacket providing separate passages for cooling air to protect said feed spout, means to force air through some of said passages in the jacket of said spout and directly into the coke being discharged from said spout, and means to force cooling media through the remainder of said passages to protect the feed spout against overheating.

5. The construction of claim 4 in which said cooling media is air and means are provided to discharge the same through said tuyeres after being heated in said jacket.

References Cited in the file of this patent

UNITED STATES PATENTS

| Re. 835 | Fales | Oct. 18, 1859 |
| 4,527 | Fales | May 16, 1846 |
| 906,717 | Johnson | Dec. 15, 1908 |
| 1,948,695 | Brassert | Feb. 27, 1934 |
| 2,235,939 | Maag | Mar. 25, 1941 |
| 2,255,379 | Crawford | Sept. 9, 1941 |